April 24, 1951 B. W. DOUGLASS 2,549,785
AIRCRAFT FUEL TANK EJECTOR
Filed April 10, 1946
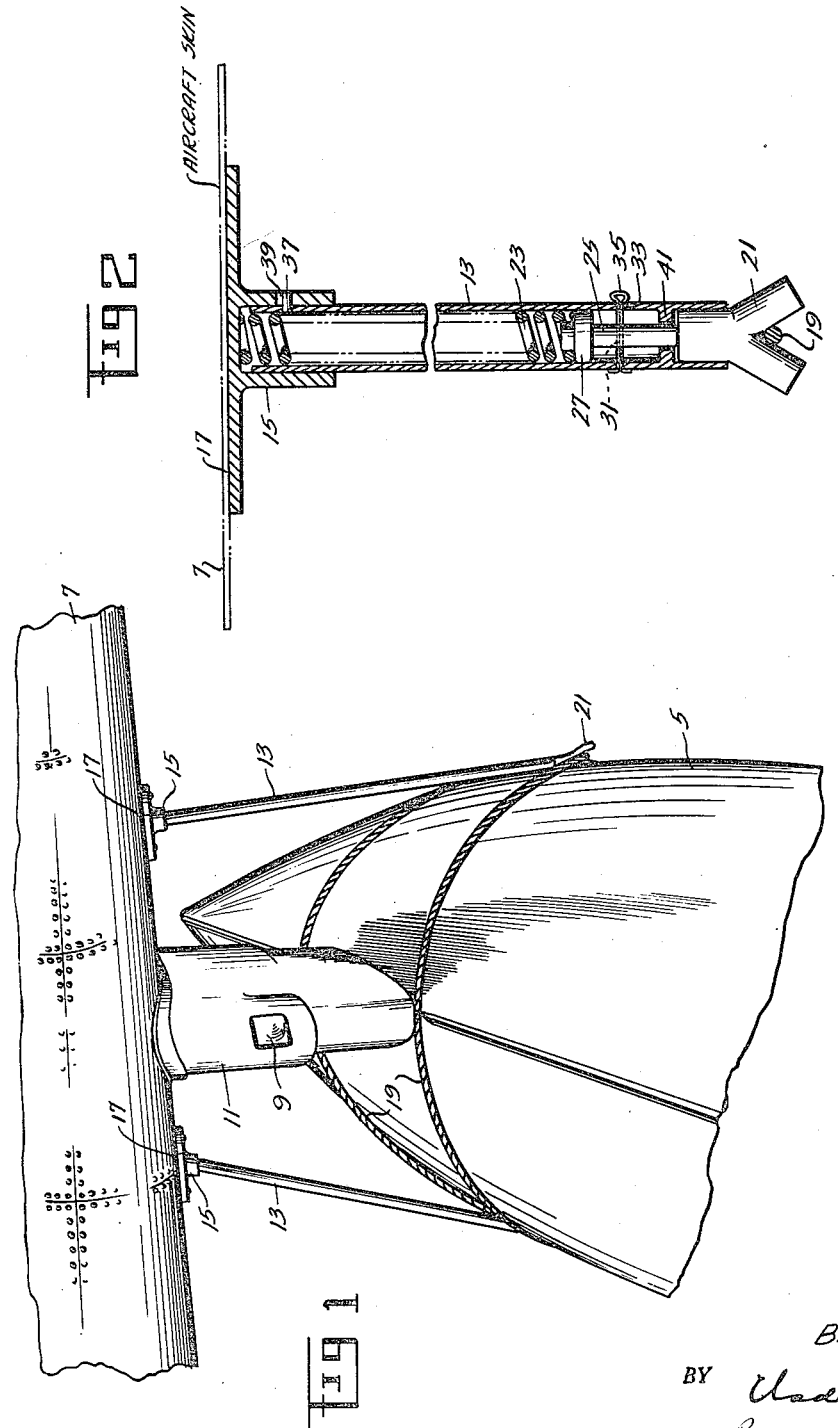
INVENTOR.
BEN W. DOUGLASS

Patented Apr. 24, 1951　　　　　　　　　　　　　　　　2,549,785

UNITED STATES PATENT OFFICE 2,549,785

AIRCRAFT FUEL TANK EJECTOR

Ben W. Douglass, Dayton, Ohio

Application April 10, 1946, Serial No. 661,035

4 Claims. (Cl. 244—135)

(Granted under the act of March 3, 1883, as amended April 30, 1928; 370 O. G. 757)

The invention described herein may be manufactured and used by or for the Government for governmental purposes without payment to me of any royalty thereon.

This invention relates to spring actuated ejection means and more particularly to such means for assisting in ejecting droppable containers such as jettison fuel tanks and the like from airplanes in flight.

Airplanes making long flights often carry droppable containers such as auxiliary fuel tanks mounted externally of the aircraft. It has been found to be a decided advantage to be able to jettison these fuel tanks when they are empty from the airplane in flight. This has often been found necessary in combat aircraft in order to reduce the air drag caused by these auxiliary fuel tanks carried on the outer surface of the airplanes, thereby allowing greater maneuverability and speed.

It has been found that these jettisoned fuel tanks often are not thrown clear of the airplane and have struck and caused damage to external surfaces. Therefore the need has arisen to be able to eject these jettison auxiliary fuel tanks from the proximity of the air plane while it is in flight. If this is done the possibility of the tanks damaging the fuselage, wings or empennage is eliminated.

While the use of rubber means for ejecting fuel tanks from the proximity of an airplane in the flight has been investigated, it has been found that such rubber means will not operate satisfactorily under many conditions. For example, at low temperatures the use of rubber is unsatisfactory due to the fact that it sets and loses its resiliency. Many other disadvantages of rubber have been found which make its use unsatisfactory. Tests have shown that metallic spring operated mechanisms for ejecting fuel tanks operate much more satisfactorily.

It is therefore an object of this invention to provide a spring operated means for ejecting droppable containers mounted externally of an airplane from the proximity of the airplane while in flight.

It is a further object of this invention to provide a plurality of spring actuated mechanisms for ejecting droppable containers mounted externally of an airplane in flight which are contained in struts which act as braces for the droppable container, said spring actuated mechanisms projecting said struts from the proximity of the airplane simultaneously with the droppable container thereby lessening the air drag on said airplane.

It is a still further object of this invention to provide a spring actuated mechanism which operates automatically to project a droppable container mounted externally of an airplane from the proximity of the airplane while in flight as soon as said fuel tank is released from said airplane.

It is a still further object of this invention to provide a spring actuated mechanism for ejecting droppable containers mounted externally of an airplane which can be locked in a compressed position while the container is mounted on the airplane so as to eliminate any hindrance in the loading of said fuel tank on the said airplane.

These and other objects of my invention become apparent with the following detailed description taken in conjunction with the accompanying drawings in which:

Fig. 1 is a perspective view of one particular embodiment of my invention attached to a droppable container in position on an airplane.

Fig. 2 is a cut away front view of one of the struts containing the spring mechanism.

A droppable container such as a jettison fuel tank 5 is mounted to the under side of an airplane wing 7 by means of a bomb shackle 9 enclosed in fairing 11. A pair of bracing struts 13 have one end seated in foot plates 15 which in turn are secured to the underside of wing 7 as at 17. Struts 13 extend downwardly on each side of fuel tank 5 and a sling cable 19 passes over the top of fuel tank 5 around bomb shackle fairing 11 and engages yokes 21 extending from the open end of struts 13. The sling cable 19 is of such a diameter that when engaged by the yokes 21 it will fit tightly across the upper surface of the fuel tank 5 and hold struts 13 in position in foot plates 15. While this cable sling 19 illustrates one particular method of engaging fuel tank 5 with the yokes 21, it can readily be seen that any suitable attaching means provided on fuel tank 5 would be satisfactory.

Within each strut 13 is a compression spring 23 having one end thereof abutting against foot plate 15. A plunger 25 fits into the other end of spring 23. A shoulder 27 is provided on plunger 25 to support spring 23 and has a diameter just slightly less than the inside diameter of housing 13 so that it acts as a guide for plunger 25 keeping it centered in strut 13 at all times. Plunger 25 is drilled as at 31 and strut 13 is likewise drilled as at 33 to provide for a locking pin 35 which when inserted prevents plunger 25 from moving downwardly. A pin 37 extends laterally from an upper portion of strut 13 and is adapted to fit into a longitudinal bayonet slot 39 positioned in foot plate 15 so that when strut 13 is forced upwardly compressing spring 23, the slot 39 will be aligned with pin 37. By turning strut 13 so that pin 37 fits into slot 39, the strut can be pinned to the foot plate 15 when the spring 23 is compressed. A stop ring 41 is rigidly secured to the inner surface of strut 13 and is provided with an aperture large enough to allow the shank portion of plunger 25 to pass through it. Stop ring 41 is positioned in strut 13 so that the shoulder 27 of plunger 25 strikes it when plunger 25 is forced downwardly by spring 23. Yoke 21 fits into the free end of strut 13 and abuts against stop ring 41 where it is held by the action of sling cable 19 on fuel tank 5.

In operation the spring mechanism parts are placed in each strut 13. Each strut 13 is fitted into its respective foot plate 15 and the spring 23 is compressed and held in the compressed position by means of pin 37 in slot 39. Plunger 25 is locked in position by means of pin 35. This positions the bottom of plunger 25 flushed with the bottom of stop ring 41. Yoke 21 is then inserted in the open end of strut 13. Fuel tank 5 is then positioned and held by bomb shackle 9. Sling cable 19 is hooked into the Y of the yoke 21 thus holding yoke 21 in position against the bottom of stop ring 41 in strut 13. The strut is then turned to disengage pin 37 from slot 39 and the pin 35 is then removed but neither the plunger or spring can move downwardly due to the restraining action of tight cable sling 19 stretched across the surface of fuel tank 5 and engaging yokes 21.

When the fuel in tank 5 is consumed by the airplane in flight, the bomb shackle 9 is actuated from within the airplane and the fuel tank 5 is jettisoned. When the fuel tank 5 is jettisoned the spring 23 in each strut 13 is then freed and expands forcing the plunger 25 downwardly which in turn forces yoke 21 rapidly downward. Both yokes 21 act on sling cable 19 and eject the fuel tank 5 from the proximity of the airplane. When the shoulder 27 of plunger 25 strikes the stop ring 41, this likewise ejects the struts 13, and the enclosed spring mechanism, away from the wing and proximity of the airplane.

It will thus be seen that I have provided a simple effective means for ejecting droppable containers such as empty jettison fuel tanks and the like from the proximity of an airplane in flight.

While I have described one particular embodiment of my invention it is to be understood that I do not wish to be restricted thereto and that I intend to cover all modifications thereof which would be apparent to one skilled in the art to which come within the spirit and scope of the appended claims.

I claim:

1. Means for assisting in the ejection of a droppable container mounted externally of an aircraft, comprising in combination with said container and releasable supporting means therefor a pair of bracing struts symmetrically disposed on opposite sides of the center line of the container, and each having the upper end thereof abutting the aircraft structure, a sliding abutment positioned at the lower end of each strut axially movable relative to said strut, flexible thrust distributing means engaging both of said sliding abutments and the top of said container for transmitting a downwardly exerted force from both of said sliding abutments on said container upon release of the container compression spring loaded means housed within said struts and engaging said abutments to apply ejecting force therethrough to said thrust distributing means upon release of said container.

2. Means for assisting in the ejection of a droppable container mounted externally on an aircraft, comprising in combination with said container and releasable supporting means therefor a pair of bracing struts symmetrically disposed on opposite sides of the center line of the container, and each having the upper end thereof abutting the aircraft structure, a sliding abutment positioned at the lower end of each strut axially movable relative to said strut, means engaging said sliding abutments and said container for transmitting a downwardly exerted force on said container upon release thereof, compression spring loaded means housed within said struts and engaging said abutments to apply ejecting force therethrough upon release of said container, and stop means securely positioned within said struts adapted to be engaged by said compression spring loaded means when said container is released whereby said strut will be ejected simultaneously with said container.

3. Means for assisting in the ejection of a droppable container mounted externally of an aircraft comprising the combination with said container and releasable supporting means therefor of a pair of bracing struts symmetrically disposed on opposite sides of the center line of said container, and each having the upper end thereof abutting the aircraft structure a sliding abutment positioned at the lower end of each strut axially movable relative to the strut, a continuous elongated band extending over the container in contact with the upper side of said container and looped into detachable engagement at its opposite ends with said sliding abutments, compression spring loaded ejection means housed within said struts for axial movement and engaging said abutments to apply ejecting force therethrough to the opposite ends of the band to displace the container downwardly upon release of said container.

4. Means for assisting in the ejection of a droppable container mounted externally of an aircraft comprising the combination with said container and releasable supporting means therefor of a pair of bracing struts symmetrically disposed on opposite sides of the center line of said container, and each having the upper end thereof abutting the aircraft structure, a sliding abutment positioned at the lower end of each strut axially movable relative to the strut, a continuous elongated band extending over the container in contact with the upper side of said container and looped into detachable engagement at its opposite ends with said sliding abutments, compression spring loaded ejection means housed within said struts for axial movement and engaging said abutments to apply ejecting force therethrough to the opposite ends of the band to displace the container downwardly upon release of said container, and stop means securely positioned within said struts in the path of movement of said spring loaded ejection means adapted to be contacted by said spring loaded ejection means when said container is released, whereby to eject said sliding abutments simultaneously from said struts and project said container downwardly, and disengage and project said struts away from the aircraft.

BEN W. DOUGLASS.

REFERENCES CITED

The following references are of record in the file of this patent:

UNITED STATES PATENTS

| Number | Name | Date |
|---|---|---|
| 2,461,406 | Birk et al. | Feb. 8, 1949 |

FOREIGN PATENTS

| Number | Country | Date |
|---|---|---|
| 67,512 | Sweden | Aug. 6, 1926 |
| 678,917 | France | Jan. 2, 1930 |